United States Patent
Lee

(10) Patent No.: US 11,400,697 B2
(45) Date of Patent: Aug. 2, 2022

(54) WINDOW MANUFACTURING SYSTEM AND WINDOW MANUFACTURING METHOD USING THE SAME

(71) Applicant: Samsung Display Co., Ltd., Yongin-Si (KR)

(72) Inventor: Seungjun Lee, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/355,744

(22) Filed: Jun. 23, 2021

(65) Prior Publication Data

US 2022/0097356 A1 Mar. 31, 2022

(30) Foreign Application Priority Data

Sep. 25, 2020 (KR) .................... 10-2020-0124887

(51) Int. Cl.
| | |
|---|---|
| *B32B 37/12* | (2006.01) |
| *B32B 7/12* | (2006.01) |
| *B32B 17/06* | (2006.01) |
| *B32B 41/00* | (2006.01) |
| *H01L 51/52* | (2006.01) |

(52) U.S. Cl.
CPC .............. *B32B 37/12* (2013.01); *B32B 7/12* (2013.01); *B32B 17/065* (2013.01); *B32B 41/00* (2013.01); *B32B 2037/1253* (2013.01); *B32B 2305/026* (2013.01); *B32B 2457/20* (2013.01); *H01L 51/524* (2013.01)

(58) Field of Classification Search
CPC ......... B32B 37/12; B32B 7/12; B32B 17/065; B32B 41/00; B32B 2037/1253; B32B 2305/026; B32B 2457/20; H01L 51/524
See application file for complete search history.

(56) References Cited

U.S. PATENT DOCUMENTS

| | | | | |
|---|---|---|---|---|
| 2015/0060933 | A1* | 3/2015 | Ohno | ..................... H01L 51/56 29/721 |
| 2015/0314572 | A1 | 11/2015 | Murashige et al. | |
| 2020/0194723 | A1* | 6/2020 | Liu | ......................... B32B 27/08 |

FOREIGN PATENT DOCUMENTS

| | | |
|---|---|---|
| JP | 4326635 B2 | 9/2009 |
| JP | 2014113687 A | 6/2014 |
| JP | 5803535 B2 | 11/2015 |
| KR | 200255810 Y1 | 12/2001 |
| KR | 101661278 B1 | 9/2016 |

\* cited by examiner

*Primary Examiner* — Vishal I Patel
(74) *Attorney, Agent, or Firm* — Cantor Colburn LLP

(57) ABSTRACT

A window manufacturing system includes a first processing unit in which a process of providing a dummy substrate on a stage is performed, a second processing unit in which a process of providing a dummy adhesive layer on the dummy substrate is performed, a third processing unit in which a process of providing a window layer on the dummy adhesive layer is performed, and a fourth processing unit in which a process of providing a protective cover on the window layer is performed. The fourth processing unit includes a pressurization unit which presses the protective cover to the window layer.

12 Claims, 10 Drawing Sheets

WINDOW MANUFACTURING SYSTEM AND WINDOW MANUFACTURING METHOD USING THE SAME

This application claims priority to Korean Patent Application No. 10-2020-0124887, filed on Sep. 25, 2020, and all the benefits accruing therefrom under 35 U.S.C. § 119, the content of which in its entirety is herein incorporated by reference.

BACKGROUND

1. Field of Disclosure

The present disclosure relates to a window manufacturing system and a window manufacturing method using the same.

2. Description of the Related Art

An electronic device that provides an image to a user, such as a smartphone, a digital camera, a notebook computer, a navigation unit, and a smart television, includes a display device to display the image. The display device generates the image and provides the image to the user through a display screen thereof.

The display device is provided with a window to protect a display panel and a touch sensing unit from external scratches and impacts.

The window includes a plurality of window layers. The window layers are likely to be damaged in the process of attaching the window layers to each other.

SUMMARY

The present disclosure provides a window manufacturing system capable of preventing a window from being damaged and a window manufacturing method using the window manufacturing system.

Embodiments of the inventive concept provide a window manufacturing system including a first processing unit in which a process of providing a certain dummy substrate on a stage is performed, a second processing unit in which a process of providing a dummy adhesive layer on the certain dummy substrate is performed, a third processing unit in which a process of providing a certain window layer on the dummy adhesive layer is performed, and a fourth processing unit in which a process of providing a protective cover on the certain window layer is performed. The fourth processing unit includes a pressurization unit which presses the protective cover to the certain window layer.

Embodiments of the inventive concept provide a window manufacturing method including providing a dummy substrate on a stage, providing a dummy adhesive layer on the dummy substrate, providing a certain window layer on the dummy adhesive layer, providing a protective cover on the certain window layer, and pressing the protective cover to the dummy substrate to attach the certain window layer to the dummy substrate.

According to the above, when the window including plural window layers is manufactured using the window manufacturing system according to the present disclosure and the window manufacturing method using the window manufacturing system, the protective cover is disposed on an upper surface of the window layer, and the window layer is pressed indirectly due to the protective cover. The window layer, which is indirectly pressed, is covered by the protective cover. Thus, a surface of the window layer is prevented from being damaged, and the window layer is prevented from being damaged.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
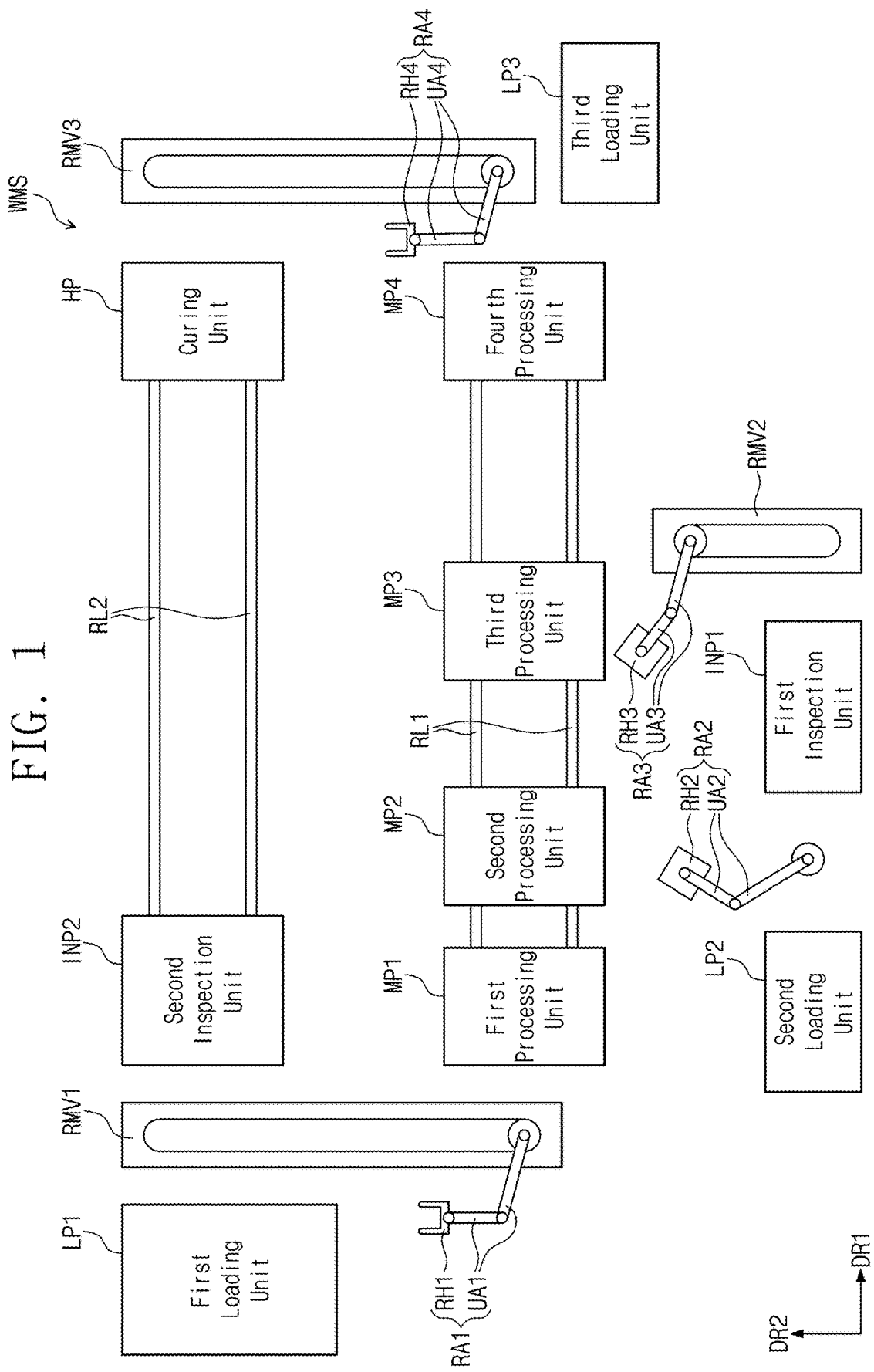
FIG. 1 is a block diagram showing a window manufacturing system according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in detail with reference to the accompanying drawings.

FIG. 1 is a block diagram showing a window manufacturing system WMS according to an embodiment of the present disclosure.

Referring to FIG. 1, the window manufacturing system WMS may include a first loading unit LP1, a second loading unit LP2, a third loading unit LP3, a first processing unit MP1, a second processing unit MP2, a third processing unit MP3, a fourth processing unit MP4, a first inspection unit INP1, a second inspection unit INP2, a curing unit HP, a first robot arm RA1, a second robot arm RA2, a third robot arm RA3, and a fourth robot arm RA4.

The first loading unit LP1 may be referred to as a first loader. The second loading unit LP2 may be referred to as a second loader. The third loading unit LP3 may be referred to as a third loader. The first processing unit MP1 may be referred to as a first processor. The second processing unit MP2 may be referred to as a second processor. The third processing unit MP3 may be referred to as a third processor. The fourth processing unit MP4 may be referred to as a fourth processor. The first inspection unit INP1 may be referred to as a first inspector. The second inspection unit INP2 may be referred to as a second inspector. The curing unit HP may be referred to as a curer.

The first processing unit MP1, the second processing unit MP2, the third processing unit MP3, and the fourth processing unit MP4 may be arranged in a first direction DR1. As an example, the first processing unit MP1, the second processing unit MP2, the third processing unit MP3, and the fourth processing unit MP4 may be sequentially arranged in a right direction. As used herein, the "right direction" means a direction from a left to a right.

The first processing unit MP1, the second processing unit MP2, the third processing unit MP3, and the fourth processing unit MP4 may be connected one after another by a first rail RL1 extending in the first direction DR1.

The curing unit HP and the second inspection unit INP2 may be spaced apart from the first processing unit MP1, the second processing unit MP2, the third processing unit MP3, and the fourth processing unit MP4 in a second direction DR2 and may be arranged in the first direction DR1. For example, the second inspection unit INP2 and the curing unit HP may be sequentially arranged in the right direction. The second direction DR2 is a direction crossing the first direction DR1.

The curing unit HP and the second inspection unit INP2 may be connected to each other by a second rail RL2 extending in the first direction DR1. The curing unit HP may be disposed adjacent to the fourth processing unit MP4 among the processing units MP1 to MP4 in the second direction DR2. The second inspection unit INP2 may be disposed adjacent to the first processing unit MP1 among the processing units MP1 to MP4 in the second direction DR2.

The second loading unit LP2 and the first inspection unit INP1 may be spaced apart from the first processing unit MP1, the second processing unit MP2, the third processing unit MP3, and the fourth processing unit MP4 in the second direction DR2 and may be arranged in the first direction DR1. For example, the second loading unit LP2 and the first inspection unit INP1 may be sequentially arranged in the right direction.

A plurality of dummy substrates may be loaded on the first loading unit LP1. Although not shown in figures, the first loading unit LP1 may have a multi-layer structure. The dummy substrates may be loaded in layers of the first loading unit LP1, respectively.

A first robot transfer unit RMV1 may extend in the second direction DR2. The first robot transfer unit RMV1 may be disposed between the first processing unit MP1 and the first loading unit LP1. The first robot transfer unit RMV1 may be disposed between the second inspection unit INP2 and the first loading unit LP1.

The first robot arm RA1 may be connected to the first robot transfer unit RMV1 and may move in the second direction DR2. Accordingly, the first robot arm RA1 may move between the first processing unit MP1 and the first loading unit LP1 and between the second inspection unit INP2 and the first loading unit LP1.

The first robot arm RA1 may transfer the dummy substrate. The dummy substrate is shown in FIGS. 2A to 2D (See DSUB in FIGS. 2A to 2D). The first robot arm RA1 may include a plurality of first unit arms UA1 and a first robot hand RH1, which are rotatably coupled to each other. As an example, FIG. 1 shows three joints of the first robot arm RA1, however, the number of the joints of the first robot arm RA1 according to the invention should not be limited to three. The first robot arm RA1 may include more than three joints in another embodiment. For example, the first robot arm RA1 may include six-axis articulated robot. The first robot hand RH1 may be connected to a joint disposed at an extreme end. The first robot hand RH1 may be connected to the first unit arm UA1 and may be rotatable.

The first robot hand RH1 may have a structure in which two bars are protruded in one direction, however, the structure of the first robot hand RH1 according to the invention should not be limited thereby or thereto. The first robot hand RH1 may have a variety of structures. For example, the first robot hand RH1 may have a structure in which three or more bars are protruded.

The first robot arm RA1 may move in the second direction DR2 by the first robot transfer unit RMV1 and may be disposed adjacent to the first loading unit LP1. The first robot arm RA1 may transfer one dummy substrate from the first loading unit LP1.

In an embodiment, for example, one dummy substrate may be loaded on the first robot hand RH1 from the first loading unit LP1, and the first unit arms UA1 and the first robot hand RH1 of the first robot arm RA1 may rotate and move to transfer the one dummy substrate to the outside of the first loading unit LP1.

The first robot arm RA1 may move in the second direction DR2 by the first robot transfer unit RMV1 and may be disposed adjacent to the first processing unit MP1.

The first unit arms UA1 and the first robot hand RH1 of the first robot arm RA1 may be rotatable with respect to each other, and the first robot arm RA1 may provide the dummy substrate to the first processing unit MP1.

The first processing unit MP1 may include a stage, and the dummy substrate transferred by the first robot arm RA1 may be disposed on the stage in the first processing unit MP1. The process performed by the first processing unit MP1 will be described in detail later with reference to FIGS. 2A to 2D. The dummy substrate disposed on the stage may be transferred to the second processing unit MP2 through the first rail RL1.

In the second processing unit MP2, a process of providing an adhesive layer on the dummy substrate may be performed. That is, the second processing unit MP2 may perform the process of providing the adhesive layer on the dummy substrate transferred from the first processing unit MP1 and disposed on the stage. The process performed by the second processing unit MP2 will be described in detail later with reference to FIG. 3.

After the adhesive layer is disposed on the dummy substrate, the stage on which the dummy substrate and the adhesive layer are disposed may be transferred to the third processing unit MP3 through the first rail RL1.

A plurality of window layers may be loaded on the second loading unit LP2. Although not shown in figures, the second loading unit LP2 may have a multi-layer structure. The window layers may be loaded on layers of the second loading unit LP2, respectively.

The second robot arm RA2 may be disposed between the second loading unit LP2 and the first inspection unit INP1. The second robot arm RA2 may transfer the window layer. The second robot arm RA2 may include a plurality of second unit arms UA2 and a second robot hand RH2, which are rotatably coupled to each other. As an example, FIG. 1 shows three joints of the second robot arm RA2, however, the number of joints of the second robot arm RA2 according to the invention should not be limited to three, and the second robot arm RA2 may include more than three joints in another embodiment. As an example, the second robot arm RA2 may include six-axis articulated robot. The second robot hand RH2 may be connected to the joint disposed at a distal end. The second robot hand RH2 may be connected to the joint and may be rotatable.

The second robot hand RH2 may have a plate shape. The second robot hand RH2 may have a vacuum adsorption structure that adsorbs the window layer through a plurality of holes therein.

The second robot arm RA2 may transfer one window layer from the second loading unit LP2. As an example, the one window layer from the second loading unit LP2 may be attached to the second robot hand RH2, and the second unit arms UA2 and the second robot hand RH2 of the second robot arm RA2 may rotate and move to transfer the window layer to the outside of the second loading unit LP2.

The second unit arms UA2 and the second robot hand RH2 of the second robot arm RA2 are rotatable with respect to each other, and thus, the second robot arm RA2 may provide the window layer to the first inspection unit INP1.

The first inspection unit INP1 may include a stage, and the window layer transferred by the second robot arm RA2 may be disposed on the stage in the first inspection unit INP1. The window layer disposed on the stage may be inspected in the first inspection unit INP1. The process performed by the first inspection unit INP1 will be described in detail later with reference to FIG. 4.

A second robot transfer unit RMV2 may extend in the second direction DR2. The second robot transfer unit RMV2 may be disposed at a right side of the first inspection unit INP1. The second robot transfer unit RMV2 may be disposed adjacent to the third processing unit MP3 from among the processing units MP1 to MP4.

The third robot arm RA3 may be connected to the second robot transfer unit RMV2 and may move in the second direction DR2. Accordingly, the third robot arm RA3 may move in a right side of the first inspection unit INP1 and a lower side of the third processing unit MP3.

The third robot arm RA3 may transfer the window layer inspected by the first inspection unit INP1. The third robot arm RA3 may have the same structure as that of the second robot arm RA2.

In an embodiment, for example, the window layer inspected by the first inspection unit INP1 may be attached to a third robot hand RH3, and third unit arms UA3 and the third robot hand RH3 of the third robot arm RA3 may rotate and move to transfer the window layer to the outside of the first inspection unit INP1.

The third robot arm RA3 may move in the second direction DR2 through the second robot transfer unit RMV2 and may be disposed adjacent to the third processing unit MP3. Although not shown in figures, a defective window layer may be discarded externally by the third robot arm RA3.

When the third unit arms UA3 and the third robot hand RH3 of the third robot arm RA3 are rotated, the third robot arm RA3 may provide the window layer to the third processing unit MP3.

The third processing unit MP3 may perform a process of providing the window layer on the adhesive layer coated on the dummy substrate transferred from the second processing unit MP2. The process performed by the third processing unit MP3 will be described in detail later with reference to FIG. 5.

After the window layer is provided on the adhesive layer, the stage on which the dummy substrate, the adhesive layer, and the window layer are disposed may be transferred to the fourth processing unit MP4 through the first rail RL1.

A plurality of protective covers may be loaded on the third loading unit LP3. Although not shown in figures, the third loading unit LP3 may have a multi-layer structure. The protective covers may be loaded on layers of the third loading unit LP3 respectively. A third robot transfer unit RMV3 may extend in the second direction DR2. The third robot transfer unit RMV3 may be disposed at a right side of the fourth processing unit MP4 and the curing unit HP. The third robot transfer unit RMV3 may be disposed adjacent to the third loading unit LP3.

The fourth robot arm RA4 may be connected to the third robot transfer unit RMV3 and may move in the second direction DR2. Accordingly, the fourth robot arm RA4 may move in a right side of the fourth processing unit MP4 and a right side of the curing unit HP.

The fourth robot arm RA4 may transfer the protective cover. The fourth robot arm RA4 may have the same structure as that of the first robot arm RA1.

The fourth robot arm RA4 may transfer one protective cover from the third loading unit LP3. For example, the one protective cover from the third loading unit LP3 may be disposed on a fourth robot hand RH4, and fourth unit arms UA4 and the fourth robot hand RH4 of the fourth robot arm RA4 may rotate and move to transfer the protective cover to the outside of the third loading unit LP3.

When the fourth unit arms UA4 and the fourth robot hand RH4 of the fourth robot arm RA4 are rotated, the fourth robot arm RA4 may provide the protective cover to the fourth processing unit MP4.

The fourth processing unit MP4 may include a pressurization unit. A process of pressurizing the window layer may be performed in the fourth processing unit MP4. That is, the fourth processing unit MP4 may provide the protective cover on the window layer transferred from the third processing unit MP3, and the pressurization unit may perform a process of pressurizing the protective cover to the window layer. The process of the fourth processing unit MP4 will be described in detail later with reference to FIGS. 6A, 6B, and 6C.

The fourth processing unit MP4 may separate the protective cover from the window layer, and the dummy substrate to which the window layer is attached may be separated from the stage by the fourth robot arm RA4 and may be transferred to the curing unit HP. The dummy substrate to which the window layer is attached may be disposed on another stage of the curing unit HP.

In the curing unit HP, a process of curing the adhesive layer disposed on the dummy substrate may be performed. The window layer may be attached to the dummy substrate by the cured adhesive layer. The process performed by the curing unit HP will be described in detail with reference to FIG. 7.

After the adhesive layer is cured between the dummy substrate and the window layer, the stage on which the dummy substrate is provided with the window layer attached thereto may be transferred to the second inspection unit INP2 through the second rail RL2.

In the second inspection unit INP2, a process of inspecting the dummy substrate to which the window layer is attached may be performed. That is, the second inspection unit INP2 may inspect the dummy substrate, the adhesive layer, and the window layer, which are disposed on the stage transferred through the second rail RL2. For example, scratches and damages on a surface of the window layer may be inspected in the second inspection unit INP2. The coating state of the adhesive layer and the leakage of the adhesive layer between the window layer and the dummy substrate may be inspected in the second inspection unit INP2.

The first processing unit MP1, the second processing unit MP2, the third processing unit MP3, the fourth processing unit MP4, the curing unit HP, the second inspection unit INP2, and the first inspection unit INP1 may be defined to be spatially separated from each other depending on the types of process.

Although not shown in figures, the first loading unit LP1, the second loading unit LP2, the third loading unit LP3, the first processing unit MP1, the second processing unit MP2, the third processing unit MP3, the fourth processing unit MP4, the first inspection unit INP1, the second inspection unit INP2, the curing unit HP, the first robot arm RA1, the second robot arm RA2, the third robot arm RA3, and the fourth robot arm RA4 may be disposed in a process chamber used to manufacture the window.

Figure 2A:
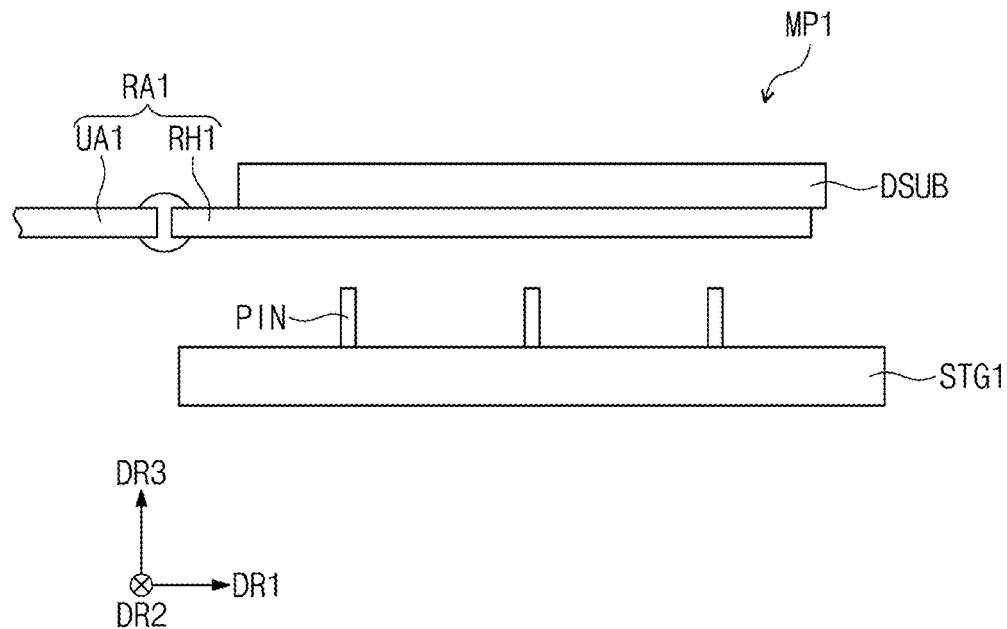
FIGS. 2A, 2C, and 2D are side views
Figure 2B:
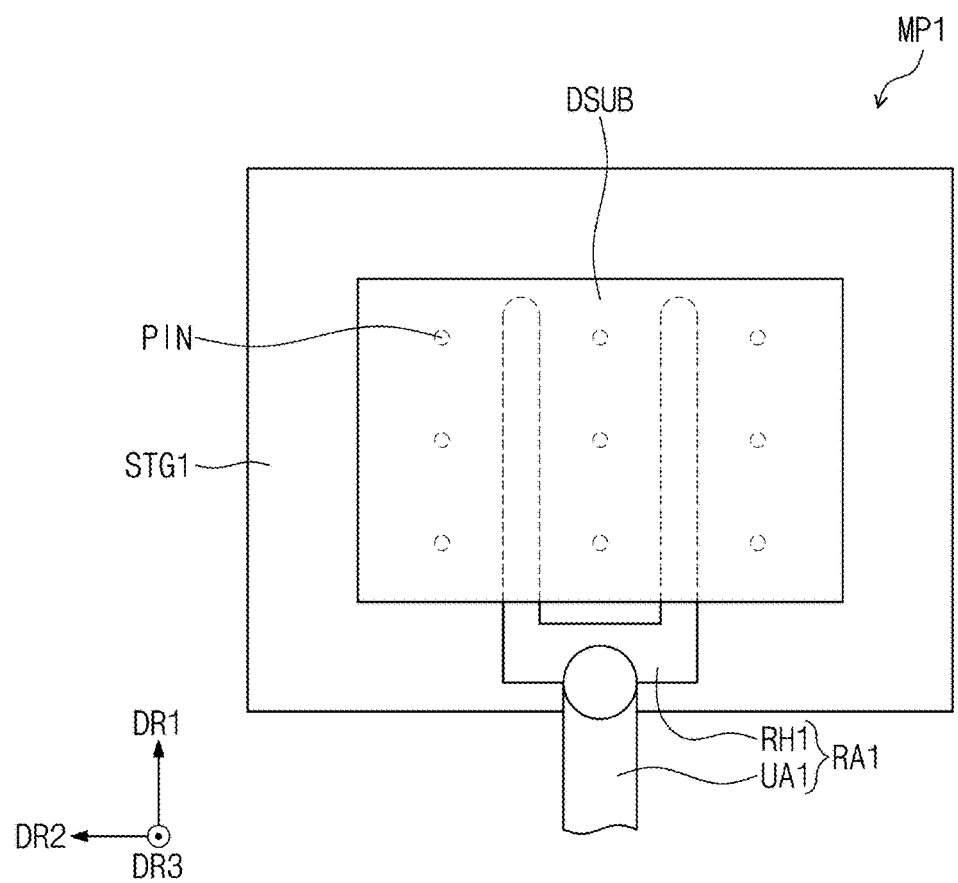
FIG. 2B is a top view showing a first processing unit to explain processes performed in the first processing unit.
Figure 2C:
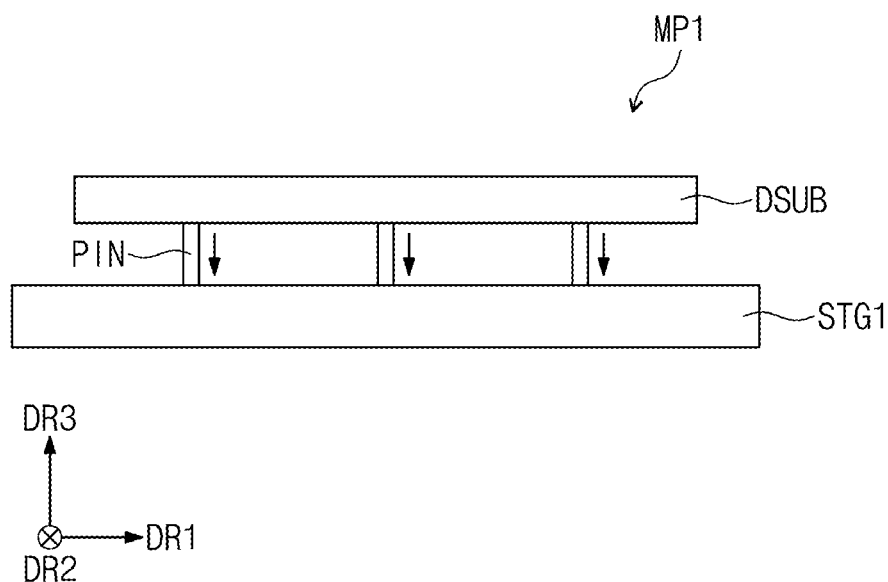
Figure 2D:
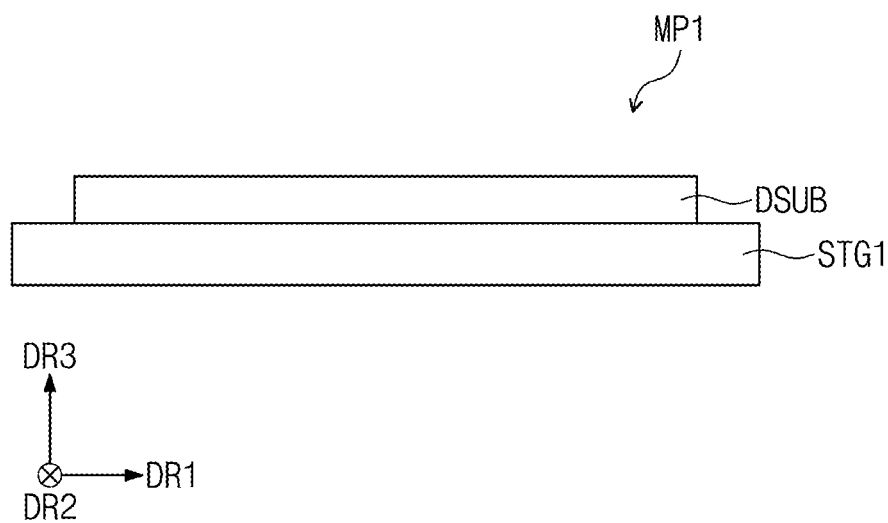

FIGS. 2A, 2C, and 2D are side views and FIG. 2B is a top view showing the first processing unit MP1 to explain processes performed in the first processing unit MP1.

Referring to FIGS. 2A, 2B, 2C, and 2D, a first stage STG1 may include a plane defined by the first direction DR1 and the second direction DR2. The first stage STG1 may include a plurality of pins PIN. The pins PIN may extend in a third direction DR3 from an upper surface of the first stage STG1. The third direction DR3 may be a direction substantially perpendicular to the plane defined by the first and second directions DR1 and DR2.

The dummy substrate DSUB may be disposed on the first robot hand RH1 of the first robot arm RA1. The dummy substrate DSUB may be disposed on the pins PIN on the upper surface of the first stage STG1 by the rotation and movement of the first robot hand RH1 and the first unit arms UA1. When viewed in a plane (i.e., in a plan view), the pins PIN may not overlap the first robot hand RH1.

After the dummy substrate DSUB is disposed on the pins PIN, the first robot arm RA1 may be removed. After the dummy substrate DSUB is disposed on the pins PIN, the pins PIN may move downward in the third direction DR3 (See FIG. 2C). The dummy substrate DSUB may move in the third direction DR3 by the pins PIN which may move inside the first stage STG1. The dummy substrate DSUB may move in the third direction DR3 by the pins PIN and may be transferred on the first stage STG1. Accordingly, the dummy substrate DSUB may be provided directly on the first stage STG1 (See FIG. 2D).

Although not shown in figures, a plurality of vacuum adsorption holes may be defined through the first stage STG1, the dummy substrate DSUB may be fixed onto the first stage STG1 by an adsorption force provided through the vacuum adsorption holes.

Figure 3:
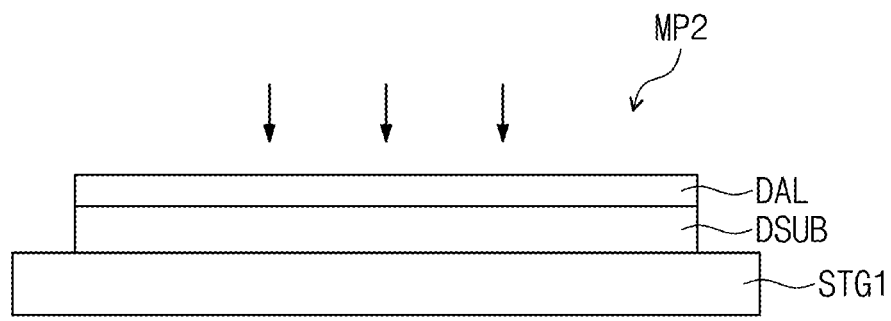
FIG. 3 is a side view showing a second processing unit to explain a process performed in the second processing unit.
Figure 3:
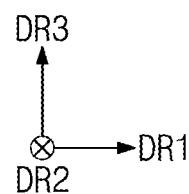

FIG. 3 is a side view showing the second processing unit MP2 to explain a process performed in the second processing unit MP2.

Referring to FIG. 3, the process of providing the adhesive layer DAL on the dummy substrate DSUB disposed on the first stage STG1 may be performed in the second processing unit MP2.

Although not shown in figures, the second processing unit MP2 may include a dispenser to provide the adhesive layer DAL on the dummy substrate DSUB. The dispenser may include an adhesive. The adhesive may be an optically clear resin (OCR) that is in a liquid state. However, the type of the adhesive should not be limited thereto or thereby. The first stage STG1 transferred from the first processing unit MP1 may be disposed on the second processing unit MP2.

The adhesive may be coated on the dummy substrate DSUB by the dispenser, and the adhesive layer DAL may be provided on the dummy substrate DSUB. The adhesive layer DAL provided on the upper surface of the dummy substrate DSUB may be defined as a dummy adhesive layer DAL. As an example, the dummy adhesive layer DAL may have a thickness of about 40 micrometers ($\mu$m) in a thickness direction (i.e., the third direction DR3). The first stage STG1 on which the dummy adhesive layer DAL is formed may be transferred to the third processing unit MP3 using the first rail RL1.

Figure 4:
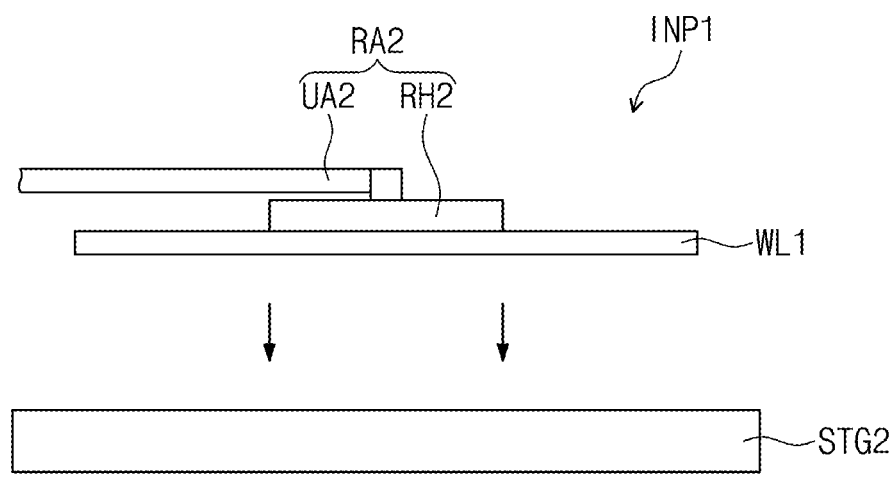
FIG. 4 is a side view showing a first inspection unit to explain a process of providing a window layer on a second stage.
Figure 4:
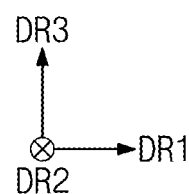

FIG. 4 is a side view showing the first inspection unit INP1 to explain a process of providing the window layer WL1 on a second stage STG2.

Referring to FIG. 4, the second robot arm RA2 may transfer one window layer WL1 from second loading unit LP2. The window layers like the window layer WL1 may be loaded on the second loading unit LP2. Hereinafter, the window layer WL1 may be referred to as a first window layer WL1. The second robot hand RH2 of the second robot arm RA2 may have the vacuum adsorption structure as described with reference to FIG. 1.

The first window layer WL1 may be vacuum-adsorbed to the second robot hand RH2. Although not shown in figures, a plurality of holes may be defined in a lower surface of the second robot hand RH2. The holes may be maintained in the vacuum state, and a predetermined adsorption force may be provided through the holes. The holes may be defined as vacuum adsorption holes. The first window layer WL1 may be absorbed to the lower surface of the second robot hand RH2 by the adsorption force provided through the holes.

The second unit arms UA2 and the second robot hand RH2 of the second robot arm RA2 may rotate with each other and move, and thus, the second robot arm RA2 may provide the first window layer WL1 on the second stage STG2.

After the first window layer WL1 is disposed on the second stage STG2, the inspection process for the first window layer WL1 may be performed. As an example, whether the first window layer WL1 is damaged and whether foreign substances are attached to the first window layer WL1 may be inspected. When the first window layer WL1 is not defective, the first window layer WL1 may be transferred to the third processing unit MP3. However, when the first window layer WL1 is defective, the first window layer WL1 may be discarded.

Figure 5:
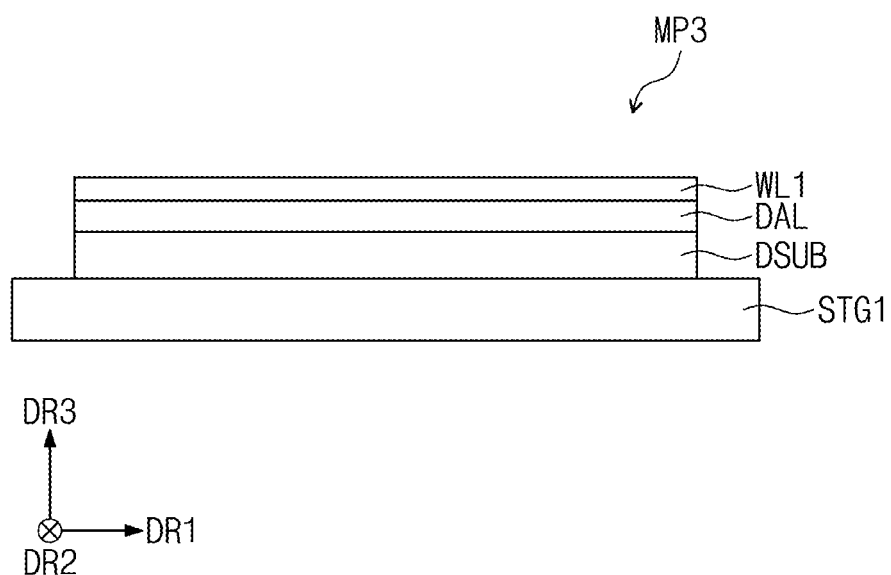
FIG. 5 is a side view showing a third processing unit to explain a process of providing a first window layer on a dummy adhesive layer.

FIG. 5 is a side view showing the third processing unit MP3 to explain a process of providing the first window layer WL1 on the dummy adhesive layer DAL.

Referring to FIG. 5, the first window layer WL1 transferred from the third robot arm RA3 may be disposed on the first stage STG1 transferred from the second processing unit MP2 in the third processing unit MP3. The first window layer WL1 may be disposed on the dummy adhesive layer DAL located on the first stage STG1 by the third robot arm RA3.

The first window layer WL1 may be defined as an ultra-thin glass ("UTG"). As an example, the first window layer WL1 may have a thickness of about 30 micrometers (μm) in the third direction DR3. However, the thickness of the first window layer WL1 according to the invention should not be limited thereto or thereby.

The first stage STG1 on which the first window layer WL1 is disposed may be transferred to the fourth processing unit MP4 through the first rail RL1.

Figure 6A:
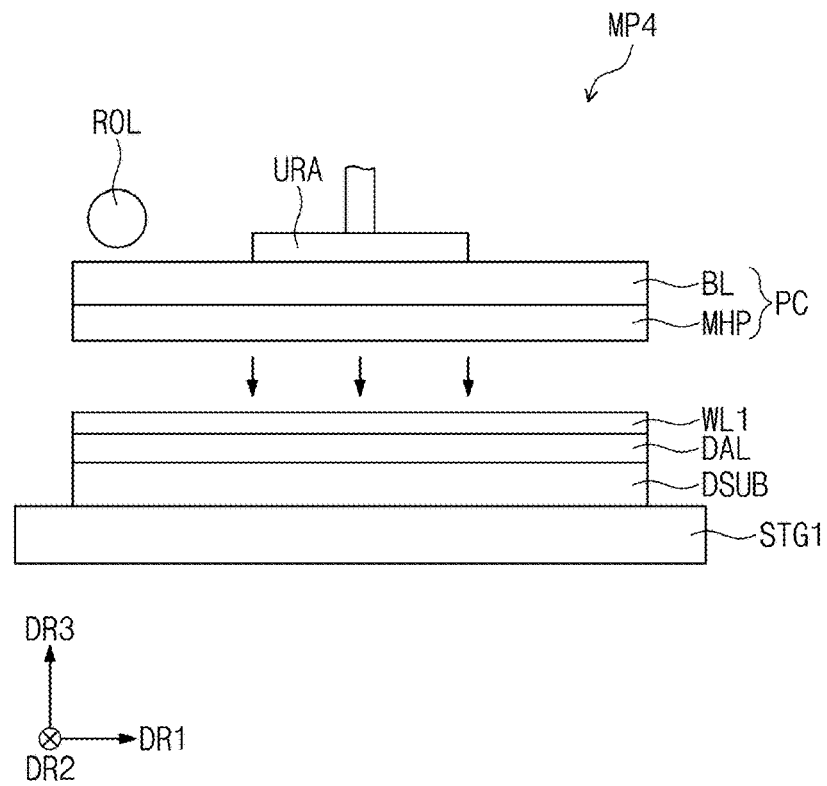
FIGS. 6A, 6B, and 6C are side views showing a fourth processing unit to explain processes performed in the fourth processing unit.
Figure 6B:
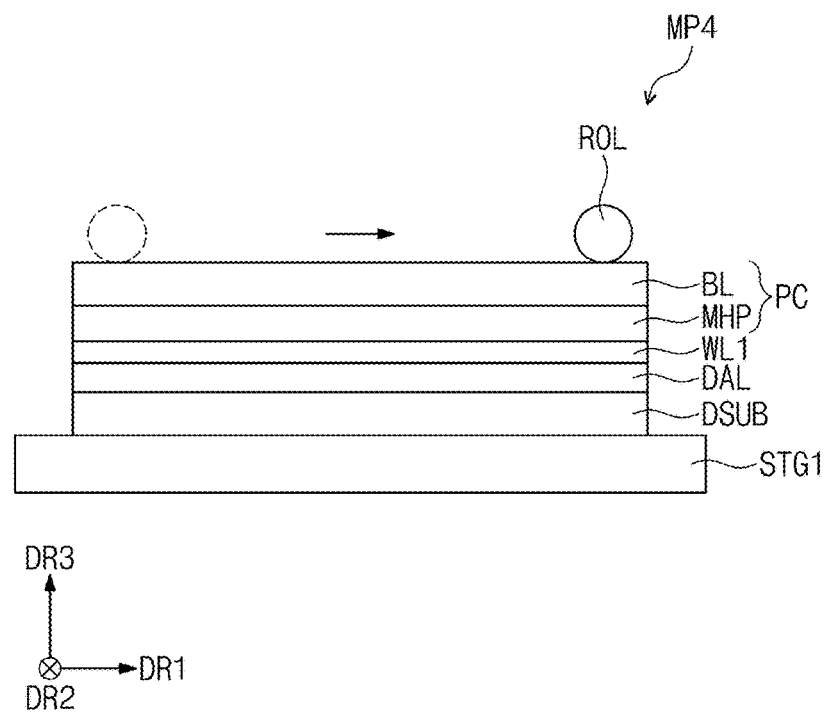
Figure 6C:
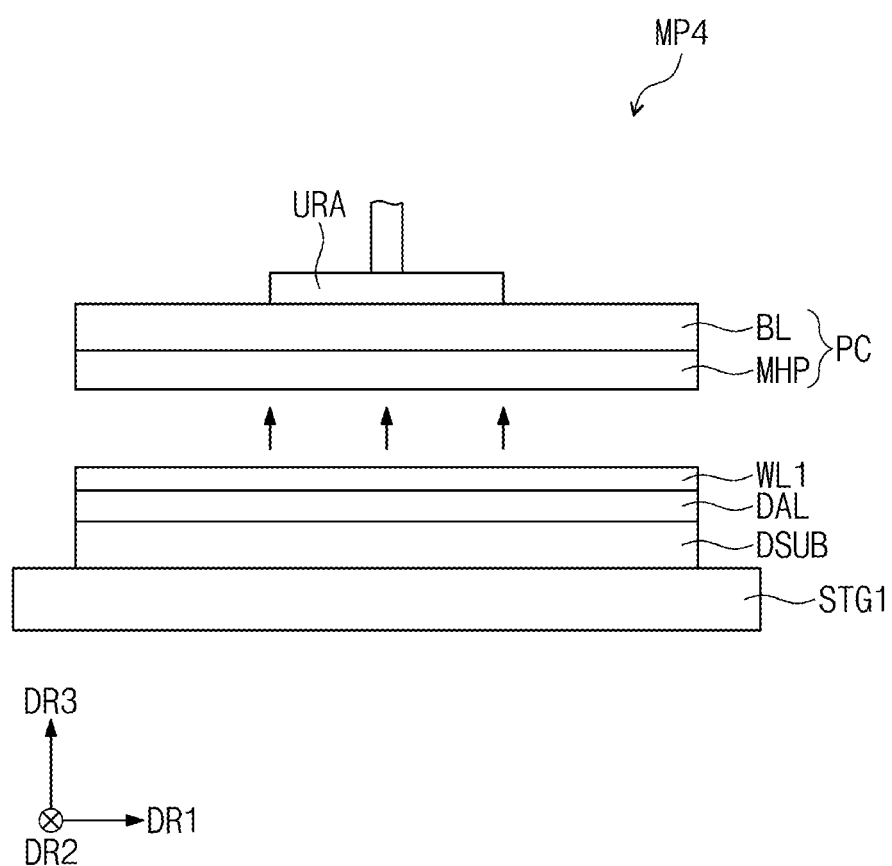

FIGS. 6A, 6B, and 6C are side views showing the fourth processing unit MP4 to explain processes performed in the fourth processing unit MP4.

Referring to FIG. 6A, the protective cover PC may be disposed on the first window layer WL1 disposed on the first stage STG1 transferred from the third processing unit MP3. As described above, the protective cover PC may be transferred to the fourth processing unit MP4 by the fourth robot arm RA4.

The fourth processing unit MP4 may include a roller ROL defined as the pressurization unit and a unit robot arm URA transferring the protective cover PC downward in the third direction DR3.

The protective cover PC transferred to the fourth processing unit MP4 by the fourth robot arm RA4 may be attached to a lower portion of the unit robot arm URA. Although not shown in figures, a plurality of vacuum adsorption holes may be defined in the lower portion of the unit robot arm URA, and the protective cover PC may be attached to the lower surface of the unit robot arm URA by the adsorption force provided through the vacuum adsorption holes.

The protective cover PC may move downward by the unit robot arm URA, and thus, the protective cover PC may be disposed on the first window layer WL1. The protective cover PC may be in contact with an upper surface of the first window layer WL1.

The roller ROL may have a cylindrical shape extending in the second direction DR2. As an example, the roller ROL may include conductive silicon with a heat resistance. The roller ROL may have a 70 HB hardness. The roller ROL may have a diameter of about 100mm. However, the shape of the roller ROL according to the invention should not be limited thereto or thereby, and the roller ROL may have a variety of shapes.

The protective cover PC may include a base layer BL and a porous layer MHP. The base layer BL may include a glass material. However, the material included in the base layer BL according to the invention should not be limited thereto or thereby.

As an example, the porous layer MHP may have a thickness of about 50 micrometers (μm) in the third direction DR3. The porous layer MHP may be disposed under the base layer BL and provided with a plurality of pores defined therein. The porous layer MHP may have a porous paper. The porous layer MHP may be attached to a lower portion of the base layer BL by an adhesive.

Referring to FIG. 6B, after the protective cover PC is provided on the first window layer WL1 by the unit robot arm URA, the unit robot arm URA may be removed. Then, the roller ROL may be disposed on the protective cover PC. The protective cover PC may be pressed by the roller ROL. The first window layer WL1 may be indirectly pressed through the protective cover PC.

In a case where the roller ROL is directly in contact with the first window layer WL1 and directly presses the first window layer WL1, scratches may be formed on the first window layer WL1 or the first window layer WL1 may be damaged.

However, according to the embodiment of the present disclosure, the upper surface of the base layer BL, not the first window layer WL1, may be directly in contact with the roller ROL. The protective cover PC may be disposed on the first window layer WL1 and may protect the first window layer WL1 from the roller ROL. Due to the protective cover PC, scratches may not be formed on the first window layer WL1, and the damage on the first window layer WL1 may be prevented. For example, the porous layer MHP may protect the first window layer WL1 to prevent the scratches from being formed on the first window layer WL1. The porous layer MHP may serve as a cushion between the first window layer WL1 and the base layer BL.

The roller ROL may move from one side of opposite sides in the first direction DR1 of the protective cover PC to the other side of the opposite sides of the protective cover PC while pressing the protective cover PC downward in the third direction DR3. As an example, the roller ROL may be operated under the following process conditions. The roller ROL may press the protective cover PC with a weight of about 60 kilograms (KG) in third direction DR3. The roller ROL may move at a speed of about 10 millimeters per second (mm/sec). The roller ROL may press the protective cover PC at room temperature of about 24 degrees in Celsius (° C.). However, the process conditions of the roller ROL according to the invention should not be limited thereto or thereby. The first window layer WL1 pressed by the roller ROL may be attached to the dummy substrate DSUB by the dummy adhesive layer DAL.

Referring to FIG. 6C, after the first window layer WL1 is attached to the dummy substrate DSUB, the protective cover PC may be separated from the first window layer WL1 by the unit robot arm URA in the third direction DR3. The protective cover PC may be repeatedly reused as long as the protective cover PC is not damaged. After the protective cover PC is transferred upward in the third direction DR3 by the unit robot arm URA, the fourth robot arm RA4 may transfer the protective cover PC to the third loading unit LP3. The dummy substrate DSUB on which the first window layer WL1 is attached may be transferred to the curing unit HP by the fourth robot arm RA4.

Figure 7:
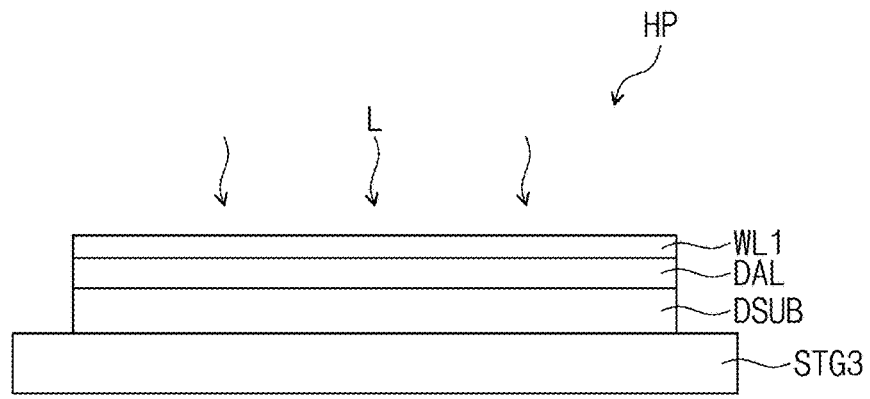
FIG. 7 is a view showing a process performed in a curing unit.
Figure 7:
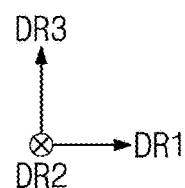

FIG. 7 is a view showing a process performed in the curing unit HP.

Referring to FIG. 7, the dummy substrate DSUB with the first window layer WL1 attached thereon and transferred to the curing unit HP may be disposed on a third stage STG3. The dummy adhesive layer DAL disposed on the dummy substrate DSUB may be cured by a light L provided from the curing unit HP. As an example, the light L may be an ultraviolet (UV) ray, however, the type of the light L according to the invention should not be limited thereto or thereby. The dummy adhesive layer DAL may be cured by the light L and may increase adhesion between the first window layer WL1 and the dummy substrate DSUB.

After the dummy adhesive layer DAL is cured, the third stage STG3 may be transferred to the second inspection unit INP2 through the second rail RL2. Although not shown in figures, the inspection with respect to the dummy substrate DSUB, the dummy adhesive layer DAL, and the first window layer WL1 may be performed in the second inspection unit INP2. The inspection performed in the second inspection unit INP2 is as described with reference to FIG. 1, and thus, details thereof are omitted.

Figure 8:
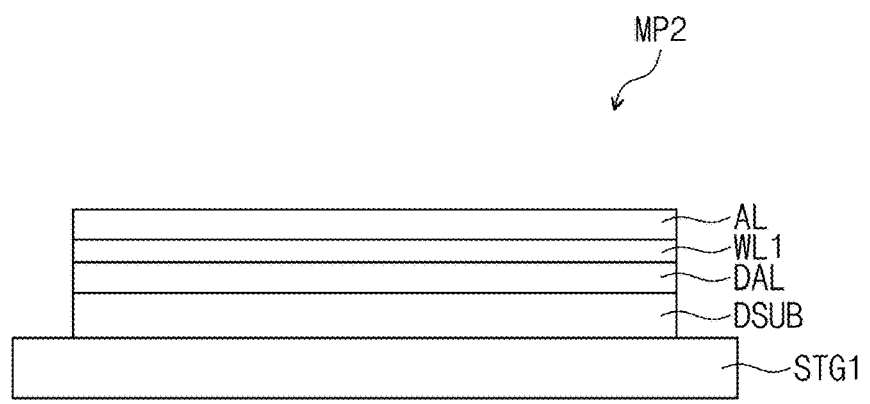
FIG. 8 is a side view showing the second processing unit to explain an additional process performed in the second processing unit.
Figure 8:
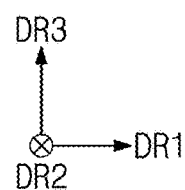

FIG. 8 is a side view showing the second processing unit MP2 to explain an additional process performed in the second processing unit MP2.

Referring to FIG. 8, the window manufactured by the window manufacturing system WMS of the present disclosure may include the plural window layers. The window layers may include the first window layer WL1 and a plurality of additional window layers. The additional window layers may be attached to the first window layer WL1 by a plurality of additional adhesive layers AL. Hereinafter, processes of providing the additional window layers on the first window layer WL1 will be described in detail.

The additional adhesive layers AL and the additional window layers may be provided on the first window layer WL1 in the second, third, and fourth processing units MP2, MP3, and MP4. The processes of providing the additional window layers on the first window layer WL1 may be substantially the same as the process of providing the first window layer WL1 on the dummy substrate DSUB.

The dummy substrate DSUB on which the first window layer WL1 inspected in the second inspection unit INP2 is attached may be transferred to the first processing unit MP1 by the first robot arm RA1. The dummy substrate DSUB transferred to the first processing unit MP1 may be disposed on the first stage STG1 of the first processing unit MP1. The first stage STG1 may be transferred to the second processing unit MP2.

The process of providing the additional adhesive layer AL on the first window layer WL1 may be performed in the second processing unit MP2. That is, the second processing unit MP2 may perform the process of providing the additional adhesive layer AL on the first window layer WL1, which is disposed on the first stage STG1 transferred from the first processing unit MP1. The additional adhesive layer AL may be provided on the first window layer WL1, and thus, the additional adhesive layer AL may be formed on the first window layer WL1.

After the additional adhesive layer AL is provided on the first window layer WL1, the first stage STG1 may be transferred to the third processing unit MP3 through the first rail RL1.

Figure 9:
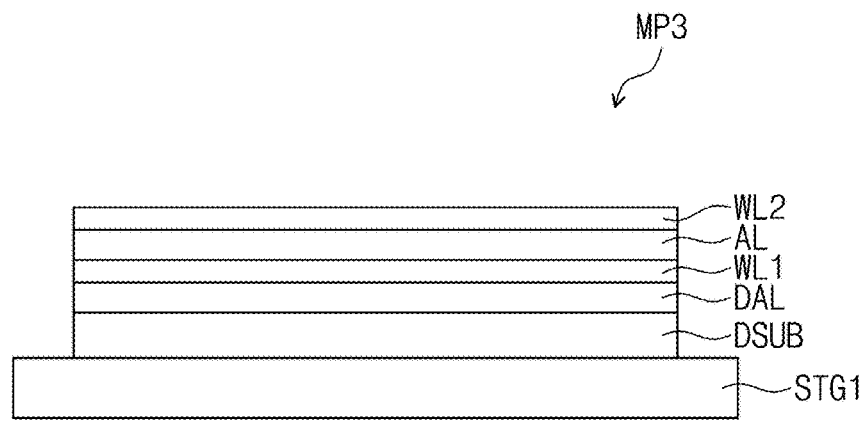
FIG. 9 is a side view showing the third processing unit to explain an additional process performed in the third processing unit.
Figure 9:
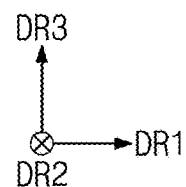

FIG. 9 is a side view showing the third processing unit MP3 to explain the additional process performed in the third processing unit MP3.

Referring to FIG. 9, the third processing unit MP3 may perform the process of providing an additional window layer WL2 on the additional adhesive layer AL, which is disposed on the first stage STG1 transferred from the second processing unit MP2. Hereinafter, the additional window layer WL2 may be defined as a second window layer WL2.

As described above, one of the window layers loaded on the second loading unit LP2 may be inspected in the first inspection unit INP1, and the inspected one window layer may be transferred to the third processing unit MP3 by the third robot arm RA3 as the second window layer WL2.

After the second window layer WL2 is provided on the additional adhesive layer AL, the first stage STG1 may be transferred to the fourth processing unit MP4 through the first rail RL1.

Figure 10:
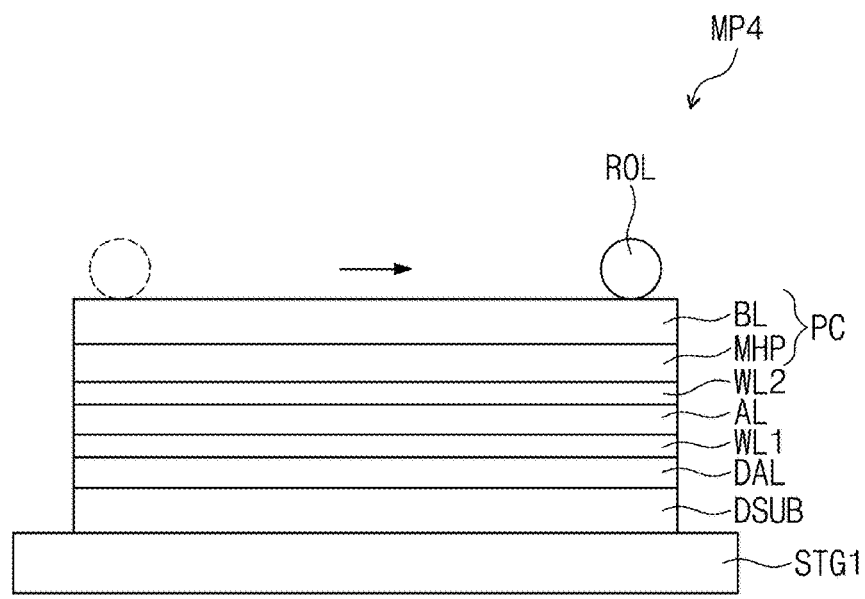
FIG. 10 is a side view showing the fourth processing unit to explain an additional process performed in the fourth processing unit.
Figure 10:
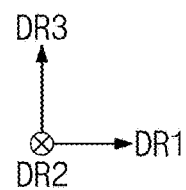

FIG. 10 is a side view showing the fourth processing unit MP4 to explain the additional process performed in the fourth processing unit MP4.

Referring to FIG. 10, the fourth processing unit MP4 may provide the protective cover PC on the second window layer WL2 disposed on the first stage STG1 transferred from the third processing unit MP3, and the roller ROL may perform the process of pressing the protective cover PC to the second window layer WL2.

The fourth processing unit MP4 may separate the protective cover PC from the second window layer WL2, and the dummy substrate DSUB on which the second window layer WL2 is attached may be separated from the first stage STG1 by the fourth robot arm RA4 and may be transferred to the curing unit HP.

Although not shown in figures, the dummy substrate DSUB on which the second window layer WL2 is attached may be disposed on a third stage STG3 of the curing unit HP.

In the curing unit HP, the process of curing the additional adhesive layer AL provided on the first window layer WL1 may be performed.

After the additional adhesive layer AL between the first window layer WL1 and the second window layer WL2 is cured, the third stage STG3 on which the second window layer WL2 attached to the first window layer WL1 is disposed may be transferred to the second inspection unit INP2 through the second rail RL2.

In the second inspection unit INP2, a process of inspecting the second window layer WL2 attached to the first window layer WL1 may be performed. That is, the second inspection unit INP2 may perform the process of inspecting the first window layer WL1, the additional adhesive layer AL, and the second window layer WL2, which are disposed on the third stage STG3 transferred through the second rail RL2.

The plural second window layers WL2 may be attached to the first window layer WL1 using the plural additional adhesive layers AL by repeatedly performing the above processes.

Figure 11:
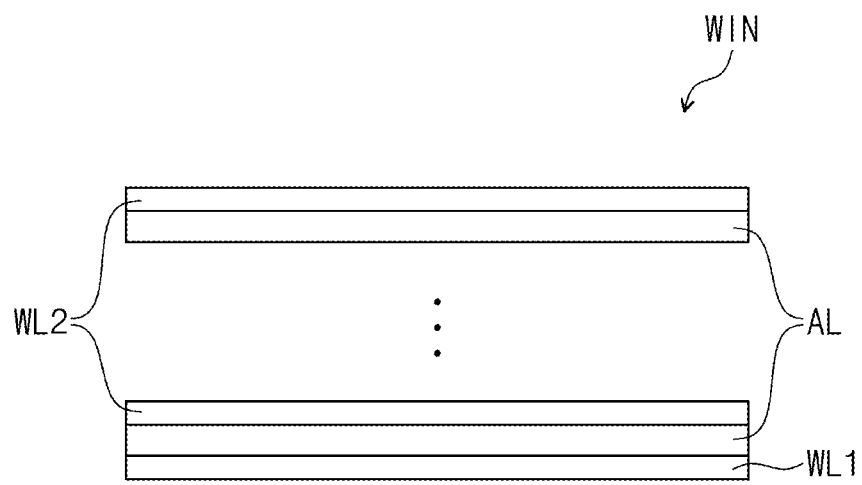
FIG. 11 is a side view showing a window manufactured by the window manufacturing system shown in FIG. 1.
Figure 11:
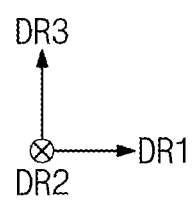

FIG. 11 is a side view showing the window WIN manufactured by the window manufacturing system WMS shown in FIG. 1.

Referring to FIG. 11, the window WIN may include the window layers WL1 and WL2. The window layers WL1 and WL2 may include the first window layer WL1 and the plural second window layers WL2.

Although not shown in figures, the dummy substrate DSUB and the dummy adhesive layer DAL may be removed after the first window layer WL1 and the second window layers WL2 are stacked, and then, the window WIN may be manufactured. As described above, the second window layers WL2 may be stacked on the first window layer WL1 by the processes repeatedly performed in the first processing unit MP1, the second processing unit MP2, the third processing unit MP3, the fourth processing unit MP4, the curing unit HP, and the second inspection unit INP2. The first and second window layers WL1 and WL2 may include fifteen layers stacked one on another. The additional adhesive layers AL may be disposed between the first and second window layers WL1 and WL2. The first and second window layers WL1 and WL2 may be attached to each other by the additional adhesive layers AL.

Figure 12:
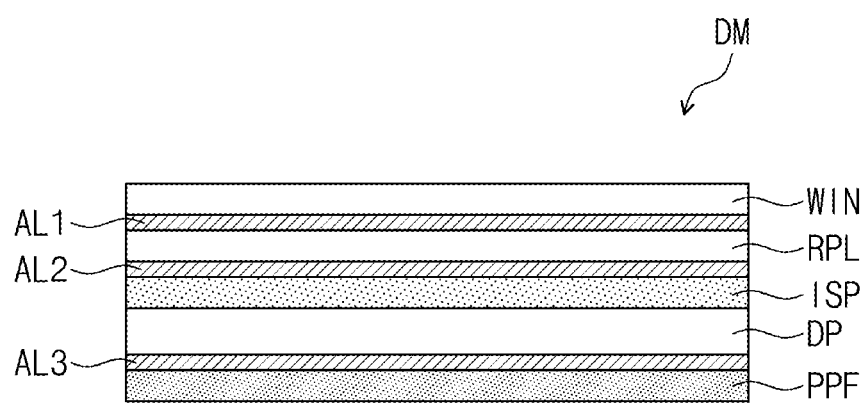
FIG. 12 is a cross-sectional view showing a display module to which a window is applied according to an embodiment of the present disclosure.

FIG. 12 is a cross-sectional view showing a display module DM to which the window WIN is applied according to an embodiment of the present disclosure.

Referring to FIG. 12, the display module DM may include a display panel DP, an input sensing part ISP, an anti-reflective layer RPL, the window WIN, a protective layer PPF, a first adhesive layer AL1, a second adhesive AL2, and a third adhesive layer AL3. The input sensing part ISP, the anti-reflective layer RPL, and the window WIN may be disposed on the display panel DP, and the protective layer PPF may be disposed under the display panel DP.

The display panel DP may be, but not limited to, a flexible display panel. For example, the display panel DP may include a plurality of electronic elements disposed on a flexible substrate.

In the embodiment of the present disclosure, the display panel DP may be a light emitting type display panel, however, the display panel DP according to the invention should not be particularly limited. For example, the display panel DP may be an organic light emitting display panel or a quantum dot light emitting display panel. A light emitting layer of the organic light emitting display panel may include an organic light emitting material. A light emitting layer of the quantum dot light emitting display panel may include a quantum dot and a quantum rod. Hereinafter, the organic light emitting display panel will be described as a representative example of the display panel DP.

The input sensing part ISP may be disposed on the display panel DP. The input sensing part ISP may include a plurality of sensors (not shown) to sense the external input. The sensors may sense the external input using a capacitive method. The input sensing part ISP may be manufactured directly on the display panel DP when the display panel DP is manufactured. However, it should not be limited thereto or thereby, and the input sensing part ISP may be attached to the display panel DP by an adhesive layer after being separately manufactured from the display panel DP.

The anti-reflective layer RPL may be disposed between the input sensing part ISP and the window WIN. The anti-reflective layer RPL may be defined as an anti-reflective film to prevent the reflection of an external light. The anti-reflective layer RPL may reduce a reflectance of the external light incident to the display panel DP from the above of the display module DM. As an example, the anti-reflective layer RPL may include a retarder and/or a polarizer.

The window WIN may be disposed on the anti-reflective layer RPL. The window WIN may protect the display panel DP, the input sensing part ISP, and the anti-reflective layer RPL from external scratches and impacts. The window WIN may have an optically transparent property.

The protective layer PPF may be disposed under the display panel DP. The protective layer PPF may be defined as a protective substrate. The protective layer PPF may protect a lower portion of the display panel DP. The protective layer PPF may include a plastic material, such as polyethylene terephthalate (PET).

The first adhesive layer AL1 may be disposed between the window WIN and the anti-reflective layer RPL. The window WIN and the anti-reflective layer RPL may be coupled to each other by the first adhesive layer AL1.

The second adhesive layer AL2 may be disposed between the anti-reflective layer RPL and the input sensing part ISP. The anti-reflective layer RPL and the input sensing part ISP may be coupled to each other by the second adhesive layer AL2.

The third adhesive layer AL3 may be disposed between the display panel DP and the protective layer PPF. The display panel DP and the protective layer PPF may be coupled to each other by the third adhesive layer AL3.

As an example, the first to third adhesive layers AL1 to AL3 may include a pressure sensitive adhesive, however, they should not be limited thereto or thereby. That is, the first to third adhesive layers AL1 to AL3 may include a variety of adhesives.

The first to third adhesive layers AL1 to AL3 may include a silicone-based resin, an acrylic-based resin, or a urethane-based resin. The first to third adhesive layers AL1 to AL3 may include a polymer resin containing the silicone-based resin, the acrylic-based resin, or the urethane-based resin. As an example, the first to third adhesive layers AL1 to AL3 may be formed of the acrylic-based resin.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. A window manufacturing system comprising:
a first processing unit in which a process of providing a certain dummy substrate on a stage is performed;
a second processing unit in which a process of providing a dummy adhesive layer on the certain dummy substrate is performed;
a third processing unit in which a process of providing a certain window layer on the dummy adhesive layer is performed; and
a fourth processing unit in which a process of providing a protective cover on the certain window layer is performed,
wherein the fourth processing unit comprises a pressurization unit which presses the protective cover to the certain window layer.

2. The window manufacturing system of claim 1, wherein the pressurization unit comprises a roller extending in a second direction.

3. The window manufacturing system of claim 2, wherein the roller presses the protective cover while moving from a first side of opposite sides in a first direction of the protective cover to a second side of the opposite sides of the protective cover, wherein the first direction is perpendicular to the second direction.

4. The window manufacturing system of claim 1, wherein the certain window layer comprises a glass material.

5. The window manufacturing system of claim 1, wherein the protective cover comprises:
a base layer; and
a porous layer disposed under the base layer and provided with a plurality of pores defined therein.

6. The window manufacturing system of claim 5, wherein the base layer comprises a glass material.

7. The window manufacturing system of claim 5, wherein the porous layer comprises a porous paper.

8. The window manufacturing system of claim 1, further comprising:
a first loading unit on which a plurality of dummy substrates are loaded; and
a first robot arm transferring the certain dummy substrate among the plurality of dummy substrates to the first processing unit from the first loading unit.

9. The window manufacturing system of claim 8, further comprising:
a second loading unit on which a plurality of window layers are disposed;
a first inspection unit which inspects the plurality of window layers;
a second robot arm which transfers the certain window layer among the plurality of window layers to the first inspection unit from the second loading unit; and
a third robot arm which transfers the certain window layer inspected by the first inspection unit to the third processing unit.

10. The window manufacturing system of claim 1, further comprising:
a third loading unit on which the protective cover is disposed; and
a fourth robot arm which transfers the protective cover to the fourth processing unit from the third loading unit and transfers the protective cover to the third loading unit from the fourth processing unit.

11. The window manufacturing system of claim 10, further comprising:
a curing unit which cures the dummy adhesive layer; and
a second inspection unit which inspects the certain window layer provided from the curing unit,
wherein the fourth robot arm is configured to transfer the certain window layer attached to the certain dummy substrate to the curing unit from the fourth processing unit.

12. The window manufacturing system of claim 11, wherein the second, third, and fourth processing units repeat corresponding processes so that a plurality of additional adhesive layers and a plurality of additional window layers are sequentially and alternately stacked with each other on the certain window layer.

* * * * *